United States Patent
Mainguet

(10) Patent No.: US 11,822,077 B2
(45) Date of Patent: Nov. 21, 2023

(54) VIRTUAL OR AUGMENTED REALITY VISION SYSTEM WITH IMAGE SENSOR OF THE EYE

(71) Applicant: COMMISSARIAT A L'ENERGIE ATOMIQUE ET AUX ENERGIES ALTERNATIVES, Paris (FR)

(72) Inventor: Jean-François Mainguet, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 24 days.

(21) Appl. No.: 17/450,076

(22) Filed: Oct. 6, 2021

(65) Prior Publication Data

US 2022/0113538 A1 Apr. 14, 2022

(30) Foreign Application Priority Data

Oct. 9, 2020 (FR) ...................... 20 10327

(51) Int. Cl.
*G02B 27/01* (2006.01)
*G02B 26/08* (2006.01)

(52) U.S. Cl.
CPC ..... *G02B 27/0101* (2013.01); *G02B 26/0833* (2013.01)

(58) Field of Classification Search
CPC ..... H04N 5/00–956; H04N 9/31–3197; G02B 27/00–648;
(Continued)

(56) References Cited

U.S. PATENT DOCUMENTS 5,982,555 A * 11/1999 Melville ................ G06V 40/19
351/209
10,698,204 B1 6/2020 Ouderkirk et al.
(Continued)

FOREIGN PATENT DOCUMENTS

FR 3 086 399 A1 3/2020

OTHER PUBLICATIONS

U.S. Appl. No. 16/923,589, filed Jul. 8, 2020, 2021/0018370 A1, Mainguet, J, et al.
(Continued)

*Primary Examiner* — Bao-Luan Q Le
*Assistant Examiner* — Christopher A Lamb, II
(74) *Attorney, Agent, or Firm* — Oblon, McClelland, Maier & Neustadt, L.L.P.

(57) ABSTRACT

A virtual reality or augmented reality vision system including: a first emission module, emitting light in the visible range; a second emission module, emitting light in the infrared range; an infrared-sensitive photodetection module; and a micromirror array. Each micromirror is capable of assuming a first position and a second position. Each micromirror of the micromirror array is configured to, in its first position, receive light from the first emission module and reflect it along an axis of interest. Each micromirror of the micromirror array is configured to, in its second position, receive light from the second emission module and reflect it substantially along the axis of interest, and receive light propagating along the axis of interest and reflect it towards the photodetection module.

15 Claims, 4 Drawing Sheets

(58) Field of Classification Search
CPC ..... G02B 2027/0105–0198; G02B 26/00–129; G03B 21/00–64
See application file for complete search history.

(56) References Cited

U.S. PATENT DOCUMENTS

| | | | | |
|---|---|---|---|---|
| 2005/0035943 | A1* | 2/2005 | Kojima | H04N 9/3129 |
| | | | | 348/E9.026 |
| 2012/0127062 | A1* | 5/2012 | Bar-Zeev | G02B 27/0172 |
| | | | | 345/6 |
| 2016/0370591 | A1* | 12/2016 | Wilson | G02B 27/02 |
| 2018/0149874 | A1* | 5/2018 | Aleem | G02B 27/0093 |
| 2019/0056599 | A1 | 2/2019 | Reshidko et al. | |
| 2020/0260057 | A1 | 8/2020 | Sivakumar et al. | |

OTHER PUBLICATIONS

U.S. Appl. No. 17/215,619, filed Mar. 29, 2021, 2021/0303812 A1, Mainguet, J, et al.
French Preliminary Search Report dated Jun. 16, 2021 in French Application 20 10327 filed on Oct. 9, 2020, 2 pages (with English Translation of Categories of Cited Documents).

* cited by examiner

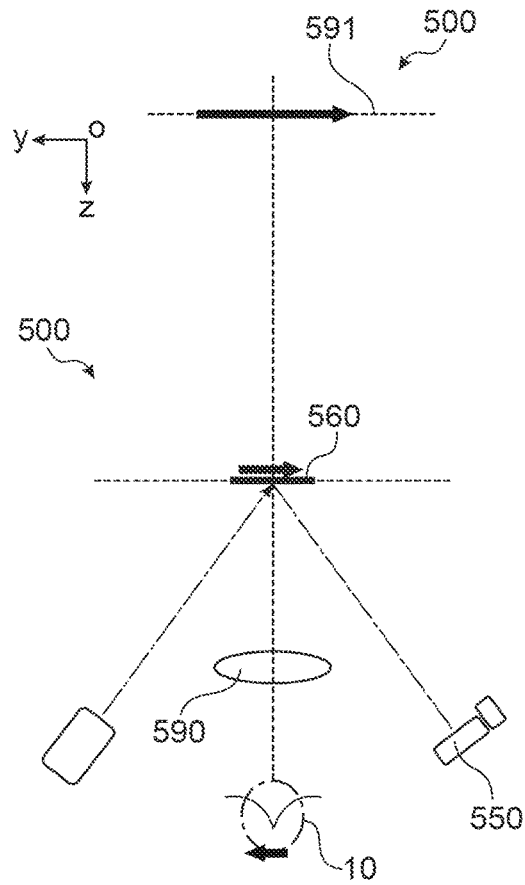
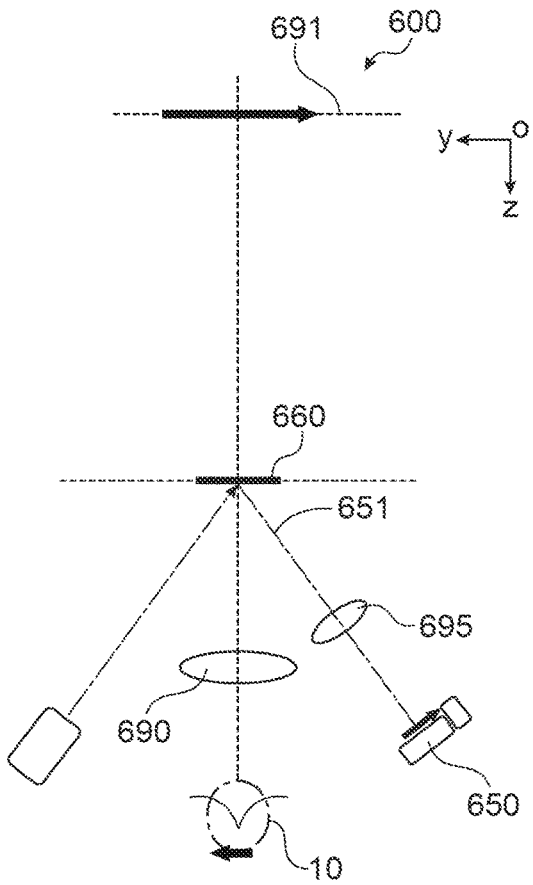
FIG.5
FIG.6A
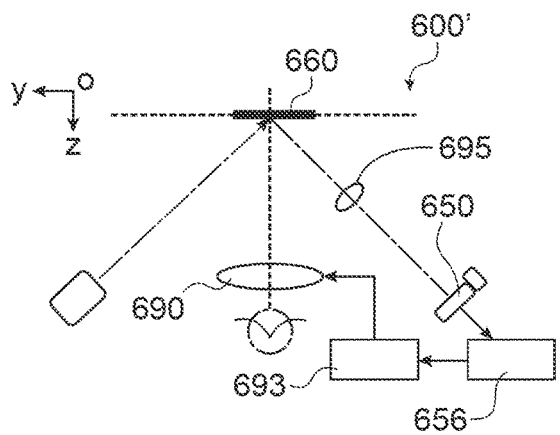
FIG.6B

VIRTUAL OR AUGMENTED REALITY VISION SYSTEM WITH IMAGE SENSOR OF THE EYE

TECHNICAL FIELD

Virtual reality refers to a technology that places a user in an artificially generated environment in which the user can interact using software.

Augmented reality refers to a technology that superimposes reality and software-generated display elements.

The invention relates to the field of virtual reality or augmented reality vision systems.

STATE OF PRIOR ART

A virtual or augmented reality vision system is known from prior art, as described in patent application FR3086399. In such a system, an image is generated at a light emission element array, and projected to the eye of the user via a projection optical system. The system further includes a photodetector array, with the light emitting element array and the photodetector array being at least partially interleaved together. In this way an image of the eye, in particular an image of the retina, can be easily acquired.

One idea underlying the invention is to improve such a system.

DISCLOSURE OF THE INVENTION

This purpose is achieved with a virtual reality or augmented reality vision system including:
- a first emission module, capable of emitting a visible light beam oriented along a first emission axis;
- a second emission module, capable of emitting an infrared light beam oriented along a second emission axis;
- an infrared-sensitive photodetection module; and
- a micromirror array, in which each micromirror is capable of assuming a first position and a second position, with the micromirrors being parallel to each other when they are all in the first position, respectively when they are all in the second position.

According to the invention, the system has the following characteristics:
- each micromirror of the micromirror array is configured to, in its first position, receive light from the first emission module and reflect it along an axis parallel to an axis of interest; and
- each micromirror of the micromirror array is configured to, in its second position, receive light from the second emission module and reflect it along an axis substantially parallel to the axis of interest, and receive light propagating along an axis parallel to the axis of interest and reflect it towards the photodetection module.

It will be noted that, in accordance with the invention, the first and second positions are distinct from each other.

By "substantially parallel to the axis of interest", it is meant "tilted by an angle of less than or equal to 10° to the axis of interest".

In use, the axis of interest is advantageously coincident with the viewing axis of an eye of a user looking straight ahead. Alternatively, a light offset element such as a planar waveguide can be used to deflect light propagating parallel to the axis of interest, to align it with the viewing axis (and vice versa).

Each micromirror of the micromirror array is thus configured to, in its first position, receive light from the first emission module and deflect at least part of that light towards the eye (directly or via a light offset element as mentioned above). Similarly, each micromirror of the micromirror array is configured to, in its second position, receive light from the second emission module and deflect at least part of that light towards the eye, and receive light returned from the eye and deflect that light towards the photodetection module (directly or via a light offset element as mentioned above).

The first and second positions of each micromirror are each distinguished from a rest position, assumed by the micromirror in the absence of any external bias, especially by an electrical signal.

The first emission module, together with the micromirror array, makes it possible to generate pixelated images to be projected to the eye of the user. The second emission module allows the eye to be illuminated, sufficiently to acquire a good image of the eye, and at a wavelength that does not disturb the user. The photodetection module makes it possible to acquire an image of the eye. The micromirror array helps to form a pixelated image. Furthermore, it deflects the infrared light emitted by the second emission module towards the eye, and deflects infrared light returned by the eye towards the photodetection module.

As in prior art described in the introduction, the invention makes it possible both to project to the eye a virtual image generated using an emissive type device, and to acquire an image of the eye. However, the invention differs from this prior art in that the virtual image projected to the eye is formed using a micromirror array. One of the ideas underlying the invention is to use a micromirror array in which each micromirror can assume two positions distinct from a rest position, and to make use of each of these two positions. Thus, each micromirror of the micromirror array can alternate between a position in which it sends visible light to the eye, for projection of a virtual image to the eye, and a position in which it sends infrared light to the eye and then deflects the infrared light returned by the eye towards a photodetection module. It is thus possible to use only commercially available components, whereas prior art described in the introduction involved developing a specific device with photodetectors and light emitting diodes interleaved together.

It may be noted that it was not obvious at all to the person skilled in the art to have the idea of making use of the two positions of the micromirrors. Conventionally, a micromirror array is used to generate a pixelated image, with each micromirror having a so-called illumination position corresponding to a switched on pixel on the image, and a so-called switching off position corresponding to a switched off pixel on the image. In the illumination position, the micromirror deflects the light towards the eye. In the switching off position, the micromirror deflects the light in a non-useful direction, where a light absorber may be located. The most obvious solution for adding an image acquisition function is to add one or more photodiodes in front of the eye, between the micromirrors. The second emission module, for infrared illumination, can also be positioned in front of the eye. Alternatively, the second emission module may be positioned close to the first emission module. In the illumination position, a micromirror then deflects visible light or infrared light towards the eye, depending on whether the first or second emission device is on. In order to avoid dazzling the photodiodes, it is understood that it is important to position the latter "in the shadow", that is in locations where they cannot receive light directly from the second emission module. In a simple case, the system includes a photodiode array, and the eye is evenly illuminated in the infrared, with all the micromirrors in the illuminating position. It is then sufficient for the photodiodes to be in shadow when all the micromirrors are in the illumination position. In a particular case, the system includes a single, large photodiode. In this case, an image of the eye can be recomposed by illuminating it with structured illumination. This structured illumination is defined using the micromirror array, in which some of the micromirrors are in the illumination position and some of the micromirrors are in the switching off position. In this case, each region of the single photodiode has to be in the shadow, for the two possible positions of each of the micromirrors. One trick to placing the photodiodes (or regions of the single photodiode) in the shadow is to position them at the bottom of a narrow hole dug in a substrate, with the walls of the hole absorbing infrared light.

Another obvious solution, to add an image acquisition function to a virtual or augmented reality optical vision system based on the use of a micromirror array, is to place the infrared source and the photodetection module in alignment with the first emission module. However, this requires the use of dichroic mirrors, which cause significant optical losses, in order to emit the infrared light in alignment with the visible light and to direct the reflected infrared light towards the photodetection module.

Preferably, for each of the micromirrors of the micromirror array, the first position and the second position are symmetrical to each other relative to an elemental plane of symmetry, with the elemental planes of symmetry associated with each of the micromirrors all being parallel to each other.

Advantageously, the system according to the invention further includes a projection optical system, located downstream of the micromirror array along a direction of propagation of the visible light beam in the virtual reality or augmented reality vision system, and capable of performing an optical conjugation between the micromirror array and a predetermined focusing surface.

The projection optical system is preferably a variable focus optical system, connected to a first piloting device for piloting the focal length of said projection optical system.

Preferably, the system according to the invention further includes a setting optical system, arranged between the micromirror array and the photodetection module, and configured to participate in an optical conjugation between a surface for receiving e an eye of an user and a detection surface of the photodetection module.

Preferably, a depth of field of the setting optical system is adapted to enable a sharp image of a surface passing through the eye of the user in use to be formed on the detection surface of the photo-detection module, for any value of the focal length of the projection optical system belonging to a determined focal length interval, with said focal length interval having a span between three millimetres and five centimetres.

An optical axis of the photodetection device and the second emission axis may be substantially parallel to within 10°.

The system according to the invention may include at least one partially reflective mirror, configured to deflect an optical axis of the photodetection device or the second emission axis, so as to superimpose these together.

The system according to the invention may further include a calculator, configured to receive as an input at least one infrared image acquired by the photo-detection module, and implement processing of this at least one infrared image so as to deduce one or more parameters relating to the user therefrom.

Advantageously, the first light emission module is capable of emitting a visible light beam, with a spectrum centred alternately on a first, a second and a third wavelength.

The first light emission module may include at least three elementary sources, adapted respectively to emit a red, blue and green light beam.

The invention also covers a first method for using a system according to the invention wherein the first light emission module is capable of emitting a visible light beam, with a spectrum centred alternately on a first, a second and a third wavelength. The method includes the following steps of:

a) piloting the first emission module, for emitting a visible light beam with a spectrum centred on the first wavelength, and piloting the mirrors of the micromirror array so as to form the first component of a colour image;

b) piloting the first emission module, for emitting a visible light beam with a spectrum centred on the second wavelength, and piloting the mirrors of the micromirror array so as to form the second component of the colour image;

c) piloting the first emission module, for emitting a visible light beam with a spectrum centred on the third wavelength, and piloting the mirrors of the micromirror array so as to form the third component of the colour image; and d) piloting the first light emission module to stop emitting the visible light beam, piloting the second emission module for emitting an infrared light beam, piloting the micromirror array so that at least one of the micromirrors is in the second position, and acquiring by the photodetection module an infrared image of a region of an eye of an user.

Advantageously, in step d), all of the micromirrors of the micromirror array are positioned in their second position.

Alternatively, the photodetection module includes a single photodiode, and in step d), only some of the micromirrors of the micromirror array are positioned in their second position.

The invention finally covers a second method for using a system according to the invention in which the first light emission module is capable of emitting a visible light beam, with a spectrum centred alternately on a first, a second and a third wavelength. The method includes the following steps of:

a) piloting the first emission module, for emitting a visible light beam with a spectrum centred on the first wavelength, and piloting the mirrors of the micromirror array so as to form the first component of a colour image;

b) piloting the first emission module, for emitting a visible light beam with a spectrum centred on the second wavelength, and piloting the mirrors of the micromirror array so as to form the second component of the colour image; and c) piloting the first emission module, for emitting a visible light beam with a spectrum centred on the third wavelength, and piloting the mirrors of the micromirror array so as to form the third component of the colour image;

wherein, for the entire duration of at least steps a) to c), the second emission module emits light and the photodetection module receives light and integrates a signal.

BRIEF DESCRIPTION OF THE FIGURES

The present invention will be better understood upon reading the description of exemplary embodiments given purely by way of indicating and in no way limiting purposes, with reference to the appended drawings in which:

FIG. 5 schematically illustrates a third embodiment of the system according to the invention, in a cross-section view;

FIGS. 6A and 6B schematically illustrate two alternatives of a fourth embodiment of the system according to the invention, in a cross-section view;

DESCRIPTION OF THE EMBODIMENTS

For the sake of clarity, the axes (Ox), (Oy) and/or (Oz) of an orthonormal reference frame are represented in the figures.

Figure 1:
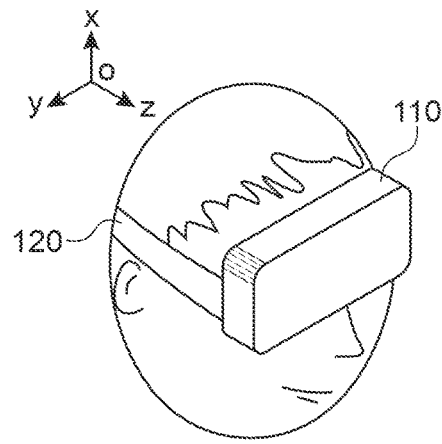
FIG. 1 schematically illustrates a view in use of a system according to a first embodiment of the invention.

To facilitate understanding of the invention, an eye 10 of an user, as positioned relative to the system according to the invention in use, is represented in some figures. The eye does not belong to the system according to the invention FIG. 1 schematically illustrates a view in use of a virtual reality vision system according to the invention. The system is not visible, as it is housed inside a support 110 intended to be mounted on a user's head. In the example of FIG. 1, this support 110 takes the form of a mask. In use, the mask 110 is held against the user's face, covering the eye of the user, by means of a strap 120 mounted integral with the mask 110 and passing behind the user's head. Alternatively, the system according to the invention can be integrated into a support such as a goggle, helmet or any other support to be mounted to the user's head.

Figure 2A:
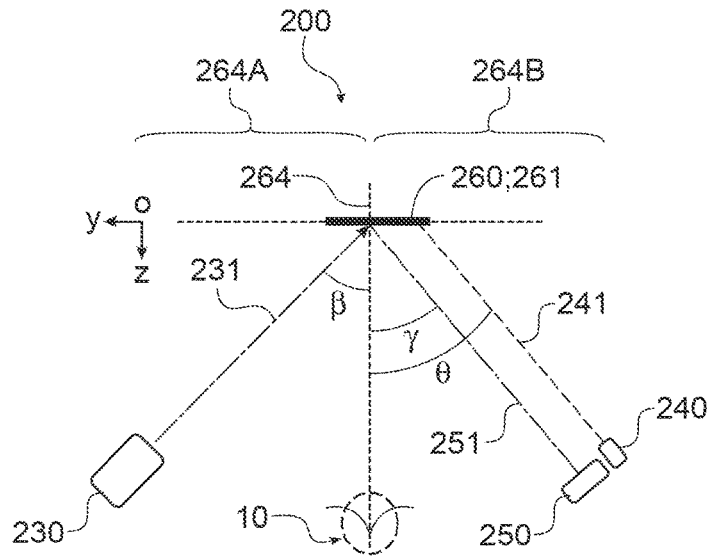
FIGS. 2A to 2C schematically illustrate a second embodiment of a system according to the invention, in a cross-section view.

FIG. 2A schematically illustrates, and in a cross-section view in a plane (yOz), a system 200 according to a second embodiment of the invention.

The system 200 includes:
a first emission module, 230, capable of emitting light at wavelengths belonging to the visible spectrum;
a second emission module, 240, capable of emitting light at wavelengths belonging to the infrared spectrum; and
an infrared-sensitive photodetection module 250 sensitive at wavelengths belonging to the spectrum of the light emitted by the second emission module 240; and
a micromirror array 260.

The first emission module 230 is configured to emit at least one collimated light beam, along a first emission axis 231. It includes here a plurality of elementary sources, not represented, each adapted to emit a monochromatic beam centred on a different wavelength value. Each elementary source may consist of a respective light emitting diode. Advantageously, the first emission module 230 includes three elementary sources, adapted to emit red, blue and green respectively, in order to form the three components of a colour image visible to the user. The visible spectrum refers to a wavelength range from 400 nm to 700 nm. Blue emission refers to light emission with a wavelength spectrum that has a single peak in the visible range, centred on a length belonging to the wavelength range from 400 nm to 480 nm. Similarly, a green emission is associated with the wavelength range from 500 nm to 560 nm. Similarly, a red emission is associated with the wavelength range from 600 nm to 700 nm.

The second emission module 240 is configured to emit at least one collimated light beam, along a second emission axis 241. It preferably includes a single light source, especially a light emitting diode, not represented. The second emission module 240 is to emit light at wavelengths outside the visible spectrum, to illuminate the eye without disturbing the user. In practice, these wavelengths extend into infrared, preferentially near infrared. The infrared spectrum refers to a wavelength range from 700 nm to 50 µm. Near infrared refers to a wavelength range from 700 nm to 3 µm. The second emission module may include a frequency filter, to block wavelengths emitted by the light emitting diode and belonging to the visible spectrum. The frequency filter may be removably mounted, so that it can be removed, for example, during a preliminary setting phase of the system.

The photodetection module 250 includes at least one infrared-sensitive photodetector, for example of the photodiode type. The at least one photodetector is sensitive, in particular, to wavelengths belonging to the emission spectrum of the second emission module 240. The at least one photodetector may consist of a single, wide-area photodetector. More preferably, it may consist of a photodetector array arranged, for example, in rows and columns. The photodetection module has an optical axis 251, which extends orthogonal to the plane of the single photodetector, respectively orthogonal to the plane of the photodetector array.

Figure 3A:
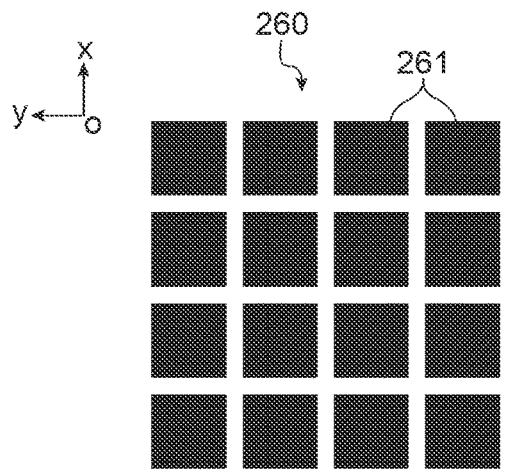
FIGS. 3A and 3B schematically illustrate a micromirror array in a system according to the invention, in a top view and in a cross-section view respectively.
Figure 3B:
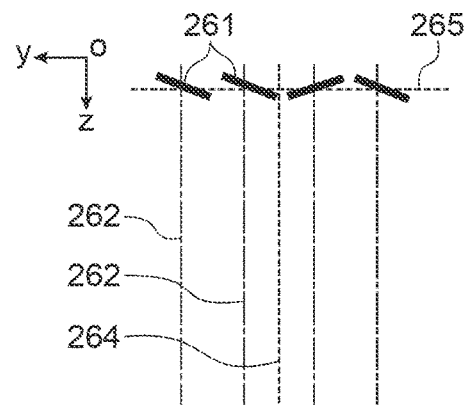

The micromirror array 260 is illustrated in more detail in FIGS. 3A and 3B. FIG. 3A schematically represents the micromirror array 260, in a top view in a plane (xOy). FIG. 3B is a cross-section view of the micromirror array 260, in a plane (yOz). The micromirror array 260 includes a plurality of micromirrors 261, arranged for example in rows and columns.

Each micromirror 261 is mounted on a rotatably movable support, not represented, and each of said movable supports can be individually piloted. In the absence of any outer bias on the movable supports, the micromirrors are in a so-called rest position, and all extend in a same rest plane 265, for example parallel to the plane (xOy). Here, to simplify the figures, each micromirror 261 is mounted rotatably movable about an axis parallel to the axis (Ox). However, the invention is not limited to this particular case, and specially covers embodiments in which the axis of rotation of the micromirrors is not parallel to the plane of their rest position.

Each micromirror 261 can assume two positions. The first position corresponds here to a rotation by an angle R1 about its axis of rotation (here an axis parallel to the axis (Ox)), from the rest position (and in the clockwise direction). The second position corresponds to a rotation by an angle R2 about its axis of rotation (here an axis parallel to the axis (Ox)), from the rest position (and in a clockwise direction). In the example represented, the axis of rotation of a micromirror 261 passes through the centre of the latter. Alternatively, the axis of rotation of a micromirror 261 may be offset below the latter.

Thus the first and second positions are distinct from each other.

In FIG. 3B, three micromirrors 261 assume the first position, and one micromirror 261 assumes the second position. In any case, the micromirrors 261 of the micromirror array are all parallel to each other when they are all in their first position, respectively when they are all in their second position. Here, but not restrictively, the two positions of each micromirror 261 are symmetrical to each other relative to an elemental plane of symmetry 262 associated with said micromirror 261. In other words, the (oriented) angle R1 takes a value +α while the (oriented) angle R2 takes a value −α. For each micromirror 261, the corresponding elemental plane of symmetry 262 is orthogonal to the rest plane 265. The elemental planes of symmetry 262 associated with each of the micromirrors 261 of the micromirror array are all parallel to each other, and parallel to a same median plane 264 passing through the centre of the micromirror array 260. Here, the median plane 264 and the elemental planes of symmetry 262 are parallel to the plane (xOz). The median plane 264 refers to a plane passing through the centre of the micromirror array 260, and orthogonal to the rest plane 265.

In FIG. 3A, a micromirror array with 16 micromirrors is represented. In practice, the micromirror array 260 typically includes more than ten thousand micromirrors, for example 2 million. Each micromirror 261 has a diameter in the order of a few microns, for example between 3 μm and 10 μm, and may have any shape (preferably optimised to maximise cumulative area occupied by the micromirrors in the micromirror array).

Figure 2B:
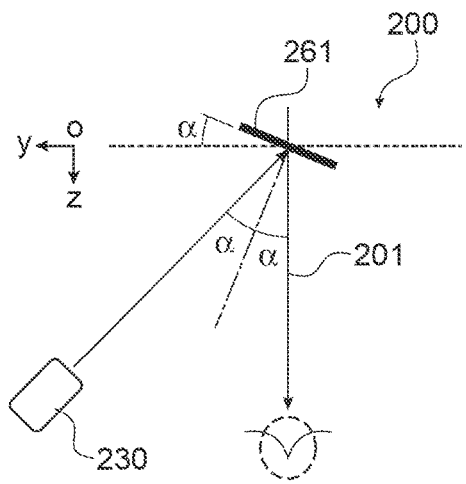
Figure 2C:
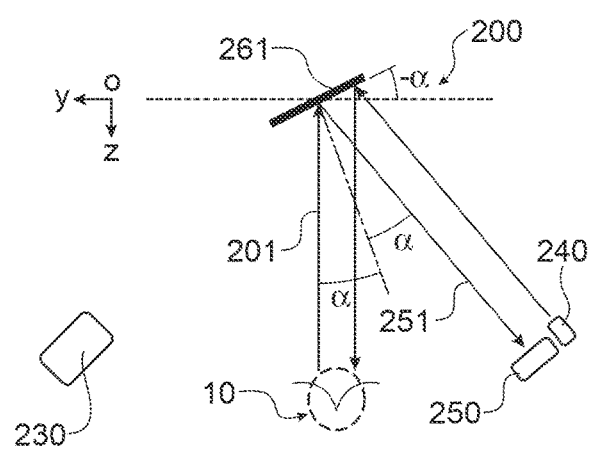

For legibility reasons, FIGS. 2A to 2C show only one micromirror 261 of the micromirror array 260. In FIG. 2A, this micromirror 261 is represented in the so-called rest position, in a plane parallel to the plane (xOy).

The median plane 264 defines two half-spaces 264A and 264B. In the example represented here, the first emission module 230 extends into the first of these two half-spaces, 264A, while the second emission module 250 and the photodetection module 240 extend into the second of these two half-spaces, 264B.

The first emission axis 231, associated with the first emission module 230, extends into the first half-space 264A. The first emission axis 231 is tilted by an angle β relative to the median plane 264.

The optical axis 251 of the photodetection module 250 extends into the second half-space 264B. The optical axis 251 is tilted by an angle γ relative to the median plane 264.

Here, due to the symmetry of the first and second positions of each of the micromirrors, the angles β and γ satisfy:

$$|\beta|=-|\gamma| \quad (1)$$

Stated differently, the optical axis 251 of the photodetection module and the first emission axis 231 are symmetrical to each other relative to the median plane 264.

The second emission axis 241, associated with the second emission module 240, extends into the second half-space 264B. The second emission axis 241 is tilted by an angle θ relative to the median plane 264.

Here, but not restrictively, the angles θ and γ satisfy:

$$|\theta|=|\gamma| \quad (2)$$

FIG. 2B illustrates the system 200, for the first position of the micromirror 261. In this first position, the micromirror 261 is rotated here by an angle R1=α about its axis of rotation, from its rest position. For example, α=17°, or α=15°, or α=12°. In this first position, the micromirror 261 receives light emitted by the first emission module 230, and reflects this light to cause it to propagate along an axis parallel to the axis of interest 201. The axis of interest 201 here extends parallel to the axis (Oz). In use, the axis of interest 201 is coincident with the eye's viewing axis when the user is looking straight ahead. In alternatives not represented, the axis of interest is not coincident with the eye's viewing axis, and a light offset element such as a planar waveguide allows light propagating along the viewing axis to be brought along the axis of interest, and vice versa.

By construction, angles α and β satisfy:

$$|\beta|=2^*|\alpha| \quad (3)$$

FIG. 2C illustrates the system 200, for the second position of the micromirror 261. In this second position, the micromirror 261 is rotated by an angle R2 about its axis of rotation, from its rest position. Here R2=−α. In this second position, the micromirror 261 receives infrared light emitted by the second emission module 240, and reflects this infrared light to cause it to propagate parallel to the axis of interest 201. In this second position, the micromirror 261 does not return light emitted by the first emission module 230 to the eye of the user along the axis 201.

$$|\gamma|=2^*|\alpha| \quad (4)$$

At least part of the infrared light incident on the eye 10 is reflected on a surface belonging to the eye, for example the retina. This light is returned to the micromirror 261, where it is reflected back to the photodetection module 250. The infrared light reflected to the photodetection module 250 thus reaches the photodetection module, enabling the latter to acquire an image of a region of the eye 10, for example an image of at least part of the retina. The infrared light returned by the eye propagates parallel to the axis of interest 201. It is therefore reflected, on the micromirror 261, in a direction spaced by an angle equal to 2*α relative to this axis. Thus, the infrared light returned by the eye and reflected on the micromirror 261 propagates parallel to the optical axis 251 of the photodetection module 250.

An ideal situation has been described here, with perfect alignments. In practice, angle deviations of a few degrees from equations (1) and (2) may be tolerated. An angular deviation between the first emission axis 231 and the symmetrical optical axis 251 of the photodetection module relative to the median plane 264 is preferably less than or equal to 10°, or even 5°, or even 2° in absolute value. Similarly, an angular deviation between the optical axis 251 of the photodetection module and the second emission axis 241 is preferably less than or equal to 10°, or even 5°, or even 2° in absolute value.

A simplified situation has been described here, with symmetry between both positions of the micromirrors. The person skilled in the art will be able to adapt easily the above teaching to the case where these two positions are not symmetrical to each other.

A simple case has been described here, in which the first emission module on the one hand, and the second emission module and the photodetection module on the other hand, extend on either side of the median plane 264. Alternatively, either of these elements may be offset, but conditions mentioned in equations (1) and (2) may be maintained by virtue of at least one offset optical fibre.

Figure 4A:
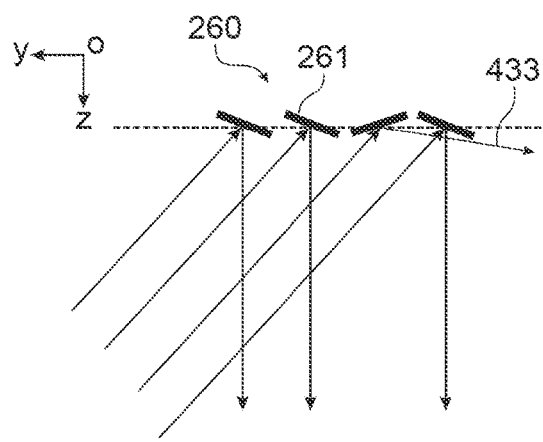
FIGS. 4A and 4B schematically illustrate the micromirror array of FIGS. 3A and 3B, in two respective configurations of the latter.
Figure 4B:
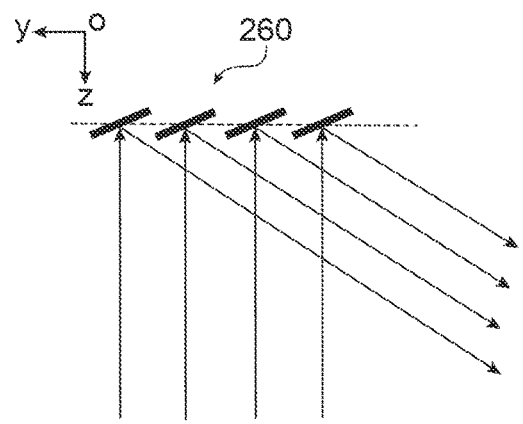

In FIGS. 2A to 2C, only one micromirror 261 of the micromirror array 260 has been shown. FIGS. 4A and 4B show the micromirror array 260 in two distinct configurations of the latter, in operation.

In operation, each of the micromirrors 261 of the micromirror array assumes either of both positions illustrated in FIGS. 2B and 2C.

In FIG. 4A, the first emission module sends light to the micromirror array 260. Each of the micromirrors 261 assumes the first position, illustrated in FIG. 2B, or the second position, illustrated in FIG. 2C. At the micromirrors 261 assuming the first position, light from the first emission module is deflected along an axis parallel to the axis of interest (towards the eye). At the micromirrors 261 assuming the second position, the light from the first emission module is deflected in a direction that is far away from the axis of interest (see ray 433). The positioning of the micromirrors 261, each in either of the first and second positions, defines a pixelated image. A micromirror 261 in the first position defines a switched on pixel of that image, while a micromirror 261 in the second position defines a switched off pixel of that image (in the colour then emitted by the first emission module). An absorber (not represented) can be placed to absorb light coming from the first emission module and deflected by the micromirrors as they assume the second position.

In FIG. 4B, the second emission module sends light to the micromirror array 260. At least one of the micromirrors 261 assumes the second position. At the micromirrors 261 assuming the second position, light from the second emission module is deflected along an axis parallel to the axis of interest (towards the eye), and light from the eye (propagating substantially parallel to the axis of interest) is deflected towards the photodetection module. At any micromirrors 261 that would assume the first position, light from the second emission module is deflected in a direction far away from the axis of interest, where an absorber (not represented) may be located. In FIG. 4B, all the micromirrors 261 of the micromirror array assume the second position, corresponding to uniform infrared illumination. In an alternative not represented, some of the micromirrors 261 assume the first position and others the second position.

FIG. 5 schematically illustrates a third embodiment of the system 500 according to the invention, in a cross-section view. The system 500 of FIG. 5 will be described only for its differences relative to the system of FIGS. 2A to 2C.

The system 500 includes a projection optical system 590, consisting of one or more lenses. In use, the projection optical system 590 extends between the eye 10 and the micromirror array 560. Stated differently, the projection optical system 590 extends downstream of the micromirror array 560, in the direction of propagation of light from the first emission module 530 when the micromirrors are in their first position. Advantageously, the vergence of the projection optical system 590 is approximately 20δ. The projection optical system 590 is adapted to perform optical conjugation between a focusing surface 591, located in use at a distance from the eye, and the micromirror array 560.

In use, and when the eye 10 is at rest (not accommodating), the focusing surface 591 is optically conjugated with a surface passing through the retina of the eye 10, in particular a surface passing through the fovea. In other words, the eye 10 at rest can clearly see objects located on the focusing surface 591. The optical conjugation between the focusing surface 591 and the surface passing through the retina is achieved by an optical system formed by the elements of the eye between the retina and the cornea, and possibly a vision correction optics such as a contact lens. For an emmetropic eye, the focusing surface 591 extends to infinity. In any case, the focusing surface 591 extends to the side of the micromirror array 560 opposite to the projection optical system 590, generally several metres away from it along the axis (Oz).

By virtue of the projection optical system 590, the focusing surface 591 is optically conjugated with the micromirror array 560. The projection optical system 590 thus participates in the optical conjugation between a surface passing through the retina of the eye and the micromirror array 560. Thus, the image formed at the micromirror array, by switching each micromirror to the first or second position, is seen clearly by the user. is thus involved, the projection optical system 590 participates in projecting an image formed at the micromirror array 560 onto the eye of the user. In FIG. 5, thick arrows symbolise optical conjugation between a surface passing through the retina of the eye and the focusing surface 591, and the optical conjugation between the focusing surface 591 and the micromirror array 560.

Advantageously, the projection optical system 590 is a variable focus optical system, so that it can be adjusted to the eye of the user. The adjustment of the focal length can be manual, based on the user's feeling of the focal length at which he/she sees the sharpest possible image. Alternatively, the focal length adjustment can be automatic. The automatic adjustment is based on an image obtained with the photodetection module 550, to obtain the sharpest possible projected image.

FIG. 6A illustrates a system 600 according to a fourth embodiment of the invention, which will be described only for its differences relative to the embodiment in FIG. 5. The system 600 differs from the embodiment of FIG. 5 in that it further includes a setting optical system 695, which extends between the micromirror array 660 and the photodetection module. The setting optical system 695 consists of one or more lenses. It is configured to be able to participate, together with the projection optical system 690, the optical system formed by the elements of the eye between the retina and the cornea, and optionally a vision correction optics such as a contact lens, and via the micromirror array 660, in the optical conjugation between a surface passing through the retina of the eye and a detection surface of the photodetection module 650. The setting optical system 695 may be advantageously a variable focus optical system.

As in the previous embodiment, the projection system 690 is here a variable focus optical system, manually adjustable to project, to the eye of the user, an image that will be seen clearly by the user. In turn, the setting optical system 695 is adjusted to obtain a sharp image of the retina of the eye, which can be achieved with an autofocus system piloting one or more lenses of the setting optical system 695, without changing setting of the projection system 690.

A surface passing through the retina of the eye 10 is optically conjugated with the focusing surface 691. By virtue of the projection optical system 690, the focusing surface 691 is optically conjugated with the micromirror array 660. Therefore, when said surface passing through the eye refers to a surface passing through the retina, the setting optical system 695 is configured to perform optical conjugation between the micromirror array 660 and the detection surface of the photodetection module 650. The detection surface of the photodetection module refers to a surface orthogonal to the optical axis 651 of the latter, along which the at least one photodetector of the photodetection module extends. Again, thick arrows symbolise optical conjugation between a surface passing through the retina of the eye and the focusing surface 691, and, the optical conjugation between the surface passing through the retina of the eye and the detection surface of the photodetection module.

As in the previous embodiment, the focusing surface 691 is optically conjugated with the micromirror array 660, so that images formed using the first emission module and the micromirror array are seen clearly by the user. Further, a surface passing through the retina of the eye is optically conjugated with the detection surface of the photodetection module 650. Thus, the photodetection module 650 can acquire a sharp image of the retina of the eye, without changing settings of the system 600 when switching from a configuration of acquiring an image of the retina to a configuration of projecting an image to the eye of the user (and vice versa).

FIG. 6B illustrates a system 600' according to an alternative of this fourth embodiment of the invention. This alternative allows the manual setting of the projection optical system 690 to be replaced by an automatic setting. This is particularly useful during a change of user, requiring an adjustment of the focal length of the projection optical system 690, for example, because the eye of the second user is not morphologically located in exactly the same place with respect to the vision system. The automatic adjustment is also of great interest for re-setting, during use by a given user, for example because the vision system has moved or because the focal distance of the optical system formed by the elements of the eye between the retina and the cornea changes slightly when the eye of the user turns (because the eye is not perfectly spherical or the user forces accommodation which causes an optical discomfort situation).

In the alternative shown in FIG. 6B, the setting optics 695, once initially adjusted, is designed to obtain a sharp image of the user's retina even if the focal length of the projection system 690 is changed by a reasonable length, less than five centimetres (for example by a few millimetres or two centimetres or even five centimetres). For this, the setting lens 695 has a large depth of field. In this way, the optical conjugation between the surface passing through the retina of the eye and the detection surface of the photodetection module 650 is maintained, even if the focal length of the projection system 690 is slightly changed. Thus, when the image is sharp to the user, the image of the retina obtained on the photodetection module 650 is also sharp, and vice versa.

In the alternative of FIG. 6B, the projection optical system 690 is a variable focus optical system, connected to a first piloting device 693. The variable focus optical system may be a liquid lens, the curvature of which may be varied by applying a voltage. Alternatively, the variable focus optical system may comprise a plurality of lenses, and its focal length may be varied by adjusting relative positions of said lenses. The first piloting device 693 may comprise electronic means and computing and/or software means. It is typically a preferably dedicated digital or analogue electronic circuit associated with a microprocessor and/or a computer. It is connected to the projection optical system 690, and capable of adjusting its focal length to a set value.

In the example illustrated in FIG. 6B, the system further includes a calculator 656, configured to receive as an input at least one image acquired by the photodetection module 650, and implement processing of this image so as to determine a sharpness index of the latter. From the sharpness index, the calculator 656 is configured to determine a focal length adjustment command and to transmit the latter to the first piloting device 693. The focal length adjustment command is determined so as to increase sharpness of the image acquired by the photodetection module 650. In this way, an autofocus method, or method for automatically setting the focal length of the projection optical system 690, may be implemented. The adjustment may be determined from images of specific zones of the retina, for example images of the fovea, by identifying the latter using the calculator 656. According to another alternative, the adjustment may be determined from a broad image of the retina, and by averaging over various zones in that image.

Setting of the setting optical system 695 may be initially performed at the factory, without a human eye, by replacing the retina of the eye with a projection support such as a white screen. The focal length of the projection system 690 is then adjusted to obtain a sharp projected image on the projection support. The projected image is for example the image of a test pattern. The projection support is advantageously observed by a camera, in order to seek the maximum sharpness of the projected image. This same test pattern is then used to set the setting optical system 695, so that the image of the latter, projected to the projection support and captured by the photodetection module 650, is sharp. In this way, the projected image of the test pattern on the projection support, as well as the image acquired by the photodetection module 650 are both sharp.

In an alternative not represented, the setting optical system 695 is a variable focus optical system, connected to a second piloting device. The second piloting device is connected to the setting optical system to adjust its focal length to a set value. The second piloting device may be connected to a calculator, configured to receive an image acquired by the photodetection module, calculate a sharpness index of this image and deduce a focal length adjustment command to be transmitted to the second piloting device therefrom. The focal length adjustment command is determined so as to maximise the sharpness index. In this way, the focal length of the setting optical system 695 can be automatically adjusted so that the latter participates in an optical conjugation between a surface passing through the eye and the detection surface of the photodetection module 650. The second piloting device is advantageously used after manually setting sharpness of the image seen by a user.

According to an alternative not represented, the second piloting device is capable of adjusting the focal length of the setting optical system 695, so that the latter participates in the optical conjugation between a surface passing through the iris of the eye and the detection surface of the photodetection module 650. The image of the iris may be transmitted by a calculator, and analysed so as to determine an identifier of the user. Advantageously, the second piloting device is capable of alternating between a position in which it acquires an image of the iris, for identification of the user, and a position in which it acquires an image of the retina.

Figure 7A:
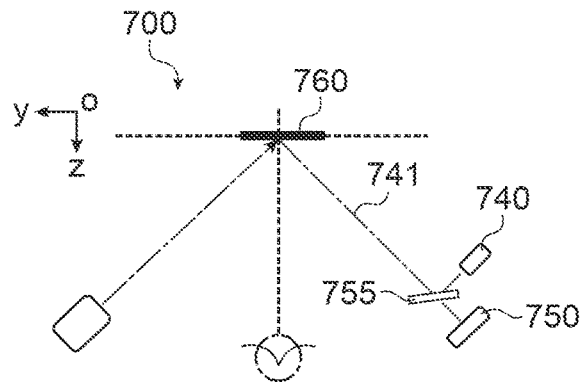
FIGS. 7A to 7D schematically illustrate different alternatives of the embodiment shown in FIG. 2A.
Figure 7B:
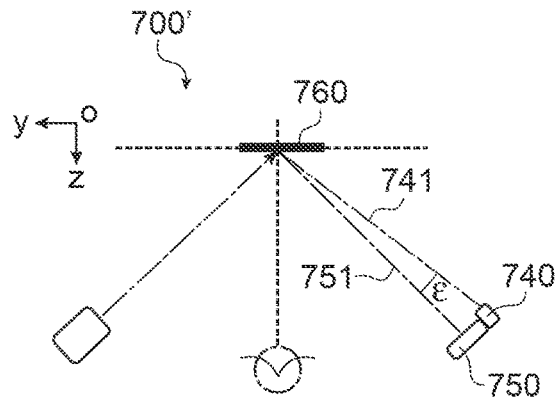
Figure 7C:
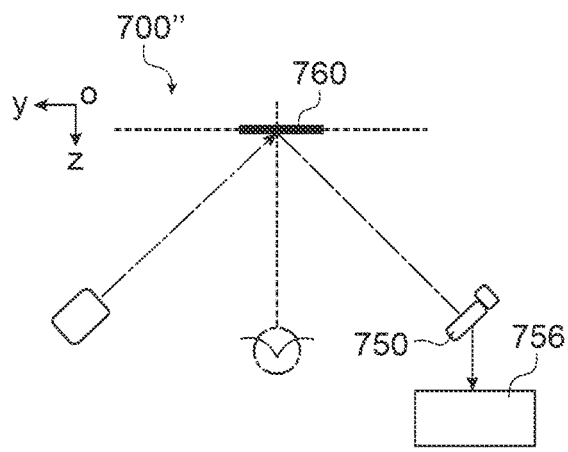

FIGS. 7A to 7C illustrate different alternatives of the invention, which may be combined together and/or combined with any of the embodiments described above.

In the alternative 700 of FIG. 7A, a partially reflective mirror 755 is positioned on the optical axis of the photodetection module 750, between the photodetection module 750 and the micromirror array 760. The partially reflective mirror 755 is configured here to deflect the second emission axis associated with the second emission module 740, so as to superimpose this second emission axis 741 with the optical axis of the photodetection module 750. Part of the emitted light is lost, which can be easily compensated for by a higher light intensity on emission, at the second emission module 740. In an alternative not represented, positions of the photodetection module and the second emission module are exchanged with each other.

In the alternative 700' of FIG. 7B, the optical axis 751 of the photodetection module 750 and the second emission axis 741 of the second emission module are tilted relative to each other by a small angle ε of between 2° and 10°.

In the alternative 700" of FIG. 7C, the photodetection module 750 is connected to a calculator 756, or processor, in a wired or wireless manner. The calculator 756 is configured to receive as an input at least one image acquired by the photo-detection module, and implement processing of this image so as to deduce one or more parameters relating to the user therefrom, for example an identifier of the user or data relating to the direction of the gaze or data relating to a movement of the eye of the user (variation of the direction of the gaze).

Figure 7D:
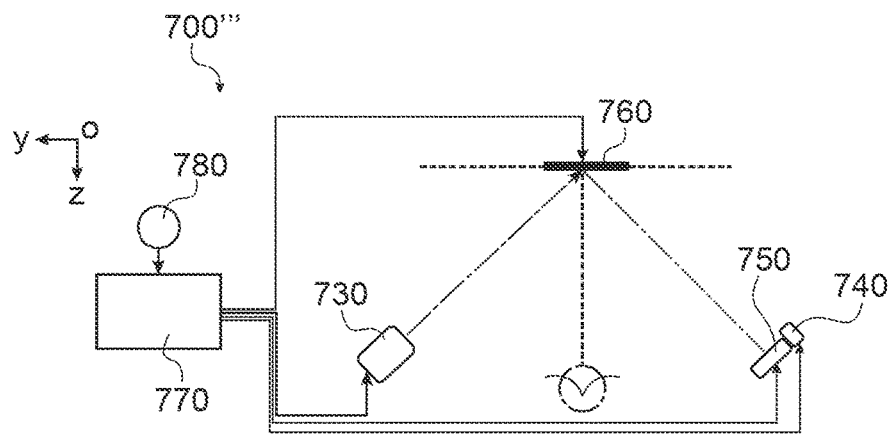

Finally, FIG. 7D illustrates an alternative 700''' including a piloting device 770, for piloting the first emission module 730, the second emission module 740, the photodetection module 750, and the micromirror array 760. The piloting device 770 may be called "third piloting device", to distinguish it from the first and second piloting devices mentioned above. The piloting device 770 may comprise electronic means and computing and/or software means. It is typically a preferably dedicated digital or analogue electronic circuit, associated with a microprocessor and/or a computer. The piloting device 770 is connected to the first emission module 730, by a wired or wireless link, and is capable of sending to the latter switching-on and switching-off instructions. The piloting device 770 is further connected to the second emission module 740, by a wired or wireless link, and is capable of sending to the latter switching-on and switching-off instructions. The piloting device 770 is further connected to the microlens array 760, by a wired or wireless link, and capable of sending instructions for positioning the micromirrors to the latter, each in either of the first or second position. Here, but in a non-limiting manner, the piloting device 770 is finally connected to the photodetection module 750, by a wired or wireless link, and is capable of sending to the latter instructions relating to the start and stop times of a light signal integration by the at least one photodetector of the photodetection module.

The piloting device 770 is connected here to a processor 780, which especially provides virtual image data to be projected to the user. The piloting device 770 is capable of transforming these virtual image data into instructions for piloting the first emission module and the microlens array. If necessary, the outer processor 780 may also provide requests for images of the eye. The piloting device 770 is then capable of transforming these requests for images of the eye into instructions for piloting the second emission module, the microlens array and the photodetection module. It is thus possible to define instants of acquisition of images of the eye, for example in the context of tracking eye movements.

According to another alternative not represented, the system according to the invention further includes a calculator as described with reference to FIG. 7C, configured to receive as an input at least one image acquired by the photo-detection module, and implement processing of this image so as to deduce data relating to a direction of gaze or to a movement of the eye of the user therefrom. These data can be transmitted to the piloting device 770, to adapt a virtual image display command according to the direction of gaze or eye movement. In this way, a virtual reality rendering can be optimised. Additionally or alternatively, data relating to the eye movement constitutes a password, which is analysed at the piloting device 770 to release or not release access to additional data.

A complete system may include two systems according to the invention as described above, each dedicated to a respective eye of the user. Alternatively, a complete system includes a single system according to the invention as described above, dedicated to one of the two eyes, while the projection of images towards the second eye is not coupled with the possibility of imaging this second eye (there is then no longer the possibility of having an autofocus on this eye, which reduces comfort of use since autofocus is replaced by manual adjustment of the focal length of the projection optical system associated with the second eye).

Various embodiments of a virtual reality vision system according to the invention have been described in the examples. According to other embodiments, not represented, the vision system according to the invention forms an augmented reality vision system. The person skilled in the art will easily be able to adapt the examples described to the case of an augmented reality vision system, for example by adding a planar waveguide to offset the micromirror array out of the field of view of the eye and to let light coming from an external scene pass through.

According to still other alternatives, the optical system according to the invention does not include a second emission module, and the photodetection module is sensitive in the visible range. An image of the eye may be acquired by the photodetection module simultaneously with light sending by the first emission module. If necessary, the pixelated image projected to the eye may be subtracted from the acquired image.

According to still other alternatives, the first emission module includes a single polychromatic light source, associated with a colour wheel to emit a light beam whose spectrum is centred in turn on different values of the wavelength.

Various methods for using a system according to the invention are described below, wherein the first emission module includes three elementary sources emitting red, blue and green light respectively. Such methods are advantageously implemented by a piloting device as illustrated in FIG. 7D.

A first method includes the following steps of:
a) switching on the first of said elementary sources, and piloting the mirrors of the micromirror array so as to form the first component of a colour image;
b) switching off the first of said elementary sources, switching on the second of said elementary sources, and piloting the mirrors of the micromirror array so as to form the second component of the colour image;
c) switching off the second of said elementary sources, switching on the third of said elementary sources, and piloting the mirrors of the micromirror array so as to form the third component of the colour image; and
d) switching off the third of said elementary sources, switching on the second emission module, piloting the micromirror array so that at least one of the micromirrors is in the second position, and acquiring by the photodetection module an infrared image of a region of an eye of an user.

Preferably, in step d), all of the micromirrors of the micromirror array are positioned in their second position, so as to achieve uniform infrared illumination of the eye.

Alternatively, the photodetection module includes only one photodetector. In this case, it is possible, in a known way, to acquire an image of the eye by successively illuminating the eye with different predetermined illumination patterns. The person skilled in the art will nevertheless have to adapt known methods, to take account of the fact that the illumination of the eye in the infrared is carried out using the micromirrors in their second position, where this second position corresponds to switched off pixels on the images to be seen by the user.

In one alternative of the above method, the second light emission module is permanently switched on. Each time the micromirror array deflects visible light towards the eye, in the form of a first pixelated image, it thus also deflects infrared light towards the eye, in the form of a second pixelated image complementary to the first pixelated image.

On average, over a sufficiently long period of time, the sum of the different second pixelated images projected to the eye provides a substantially uniform illumination. In this method, the acquisition of an image of the eye using the photodetection module is therefore carried out over a long period of time, simultaneously with the projection of visible images to the eye. In particular, the integration of the light signal by the at least one photodetector of the photodetection module lasts for the entire duration of at least one cycle consisting of the above-mentioned steps a) to c). Alternatively, this signal integration lasts for the entire duration of several cycles, where each cycle consists of the above-mentioned steps a) to c) and is concerned with an image with distinct colours. The integration over a long period of time makes it possible to carry out infrared illumination with a reduced light intensity. Furthermore, there is no need to adjust piloting rules of the first emission module and the micromirror array, in comparison with prior art.

The methods described above are easily adaptable to the case where the first emission module includes a single polychromatic light source associated with a colour wheel.

The invention claimed is:

1. A virtual reality or augmented reality vision system comprising:
    a first emission module, capable of emitting a visible light beam oriented along a first emission axis;
    a second emission module, capable of emitting an infrared light beam oriented along a second emission axis; and
    an infrared-sensitive photodetection module;
    the system further including a micromirror array, in which each micromirror is capable of assuming a first position and a second position distinct from each other, with the micromirrors being parallel to each other when they are all in the first position, respectively when they are all in the second position, and wherein:
    each micromirror of the micromirror array is configured to, in its first position, receive the visible light from the first emission module and reflect it along an axis parallel to an axis of interest; and
    each micromirror of the micromirror array is configured to, in its second position, receive the infrared light from the second emission module and reflect it along an axis substantially parallel to the axis of interest, and receive light propagating along an axis parallel to the axis of interest and reflect it towards the photodetection module.

2. The system according to claim 1, wherein for each of the micromirrors of the micromirror array, the first position and the second position are symmetrical to each other relative to an elemental plane of symmetry, with the elemental planes of symmetry associated with each of the micromirrors all being parallel to each other.

3. The system according to claim 1, further comprising a projection optical system, located downstream of the micromirror array along a direction of propagation of the visible light beam in the virtual reality or augmented reality vision system, and capable of performing an optical conjugation between the micromirror array and a predetermined focusing surface.

4. The system according to claim 3, wherein the projection optical system is a variable focus optical system, connected to a first piloting device for piloting the focal length of said projection optical system.

5. The system according to claim 3, further comprising a setting optical system, disposed between the micromirror array and the photodetection module, and configured to participate in an optical conjugation between a surface for receiving an eye of an user and a detection surface of the photodetection module.

6. The system according to claim 5, wherein a depth of field of the setting optical system is adapted to enable a sharp image of a surface passing through the eye of the user in use to be formed on the detection surface of the photo-detection module, for any value of the focal length of the projection optical system belonging to a determined focal length interval, with said focal length interval having a span of between three millimetres and five centimetres.

7. The system according to claim 1, wherein an optical axis of the photodetection device and the second emission axis are substantially parallel, to within 10°.

8. The system according to claim 1, comprising at least one partially reflective mirror, configured to deflect an optical axis of the photodetection device or the second emission axis, so as to superimpose these together.

9. The system according to claim 1, further comprising a calculator, configured to receive as an input at least one infrared image acquired by the photo-detection module, and implement processing of this at least one infrared image so as to deduce one or more parameters relating to the user therefrom.

10. The system according to claim 1, wherein the first light emission module is capable of emitting a visible light beam, with a spectrum centred alternately on a first, a second and a third wavelength.

11. The system according to claim 10, wherein the first light emission module includes at least three elementary sources, respectively adapted to emit a red, blue and green light beam.

12. A method for using a system according to claim 10, the method comprising the following steps of:
    a) piloting the first emission module, for emitting a visible light beam with a spectrum centred on the first wavelength, and piloting the mirrors of the micromirror array so as to form the first component of a colour image;
    b) piloting the first emission module, for emitting a visible light beam with a spectrum centred on the second wavelength, and piloting the mirrors of the micromirror array so as to form the second component of the colour image;
    c) piloting the first emission module, for emitting a visible light beam with a spectrum centred on the third wavelength, and piloting the mirrors of the micromirror array so as to form the third component of the colour image; and
    d) piloting the first light emission module to stop emitting the visible light beam, piloting the second emission module for emitting an infrared light beam, piloting the micromirror array so that the at least one of the micromirrors is in the second position, and acquiring by the photodetection module an infrared image of a region of an eye of an user.

13. The method according to claim 12, wherein in step d) all of the micromirrors of the micromirror array are positioned in their second position.

14. The method according to claim 12, wherein the photodetection module includes a single photodiode, and wherein, in step d), only some of the micromirrors of the micromirror array are positioned in their second position.

15. A method for using a system according to claim 10, the method comprising the following steps of:
    a) piloting the first emission module, for emitting a visible light beam with a spectrum centred on the first wavelength, and piloting the mirrors of the micromirror array so as to form the first component of a colour image;
b) piloting the first emission module, for emitting a visible light beam with a spectrum centred on the second wavelength, and piloting the mirrors of the micromirror array so as to form the second component of the colour image; and
c) piloting the first emission module, for emitting a visible light beam with a spectrum centred on the third wavelength, and piloting the mirrors of the micromirror array so as to form the third component of the colour image;
wherein, for the entire duration of at least steps a) to c), the second emission module emits light and the photodetection module receives light and integrates a signal.

* * * * *